MULTIPLE POINT BONDING APPARATUS

Filed March 27, 1962 6 Sheets-Sheet 1

INVENTORS
Cecil A. Lasch, Jr.
Boris J. Speransky
Jerry J. Whitman

BY Flehr and Swain
Attorneys

INVENTORS
Cecil A. Lasch, Jr.
Boris J. Speransky
Jerry J. Whitman
BY
Fleh, and Swain
Attorneys INVENTORS
Cecil A. Lasch, Jr.
Boris J. Speransky
Jerry J. Whitman
BY
Flehr and Swain
Attorneys INVENTORS
Cecil A. Lasch, Jr.
Boris J. Speransky
Jerry J. Whitman BY Fleh and Swain
Attorneys INVENTORS
Cecil A. Lasch, Jr.
Boris J. Speransky
Jerry J. Whitman
BY
[signature]
Attorneys

MULTIPLE POINT BONDING APPARATUS

Filed March 27, 1962 6 Sheets-Sheet 6

INVENTORS
Cecil A. Lasch, Jr.
Boris J. Speransky
Jerry J. Whitman
BY
[signature]
Attorneys

United States Patent Office 3,192,358

Patented June 29, 1965

3,192,358

MULTIPLE POINT BONDING APPARATUS

Cecil A. Lasch, Jr., Redwood City, Boris J. Speransky, Menlo Park, and Jerry J. Whitman, Palo Alto, Calif., assignors to Electroglas, Inc., Redwood City, Calif., a corporation of California Filed Mar. 27, 1962, Ser. No. 182,884
14 Claims. (Cl. 219—85)

This invention relates to a multiple point bonding apparatus and more particularly to a multiple point bonding apparatus capable of operating on X, Y and Z axes.

As the trend toward more sophisticated electronic circuitry continues and particularly with the development of microcircuitry, there is an increased demand for making interconnections between devices and components over larger areas in X and Y, but also for a range in Z.

In general, it is an object of the present invention to provide a multiple point bonding apparatus which permits bonds to be formed over a relatively large area in X and Y, and also for a range in Z.

Another object of the invention is to provide a bonding apparatus of the above character in which bonds can be formed at different points without cutting the lead wire.

Another object of the invention is to provide a bonding apparatus of the above character which can be used for forming chisel-like or knife-edge bonds as well as ball-like bonds.

Another object of the invention is to provide a bonding apparatus of the above character in which manually controlled positioning means is utilized.

Another object of the invention is to provide a bonding apparatus of the above character which utilizes a particular novel pantograph type arrangement for causing relative movement between the bonding tool and the device or element to which the bond is to be made.

Another object of the invention is to provide a bonding apparatus of the above character in which the pantograph-like apparatus can be manually controlled.

Another object of the invention is to provide a bonding apparatus of the above character in which the mechanism utilized for causing relative movement between the bonding tool and the device to which the bond is to be made can be manually held during the time the bond is being made.

Another object of the invention is to provide a bonding apparatus of the above character in which a predetermined bonding pressure is maintained even though movement of the mechanism for causing relative movement between the bonding tool and the device occurs.

Another object of the invention is to provide a bonding apparatus of the above character in which particularly novel damping means is provided.

Another object of the invention is to provide a bonding apparatus of the above character in which particularly novel means is utilized for moving the cut-off torch.

Another object of the invention is to provide a bonding apparatus of the above character in which a visual indication is given at the time a bonding operation is commenced and after it is completed.

Additional objects and features of the invention will appear from the following description in which the preferred embodiment is set forth in detail in conjunction with the accompanying drawings.

Referring to the drawings.

Figure 1:
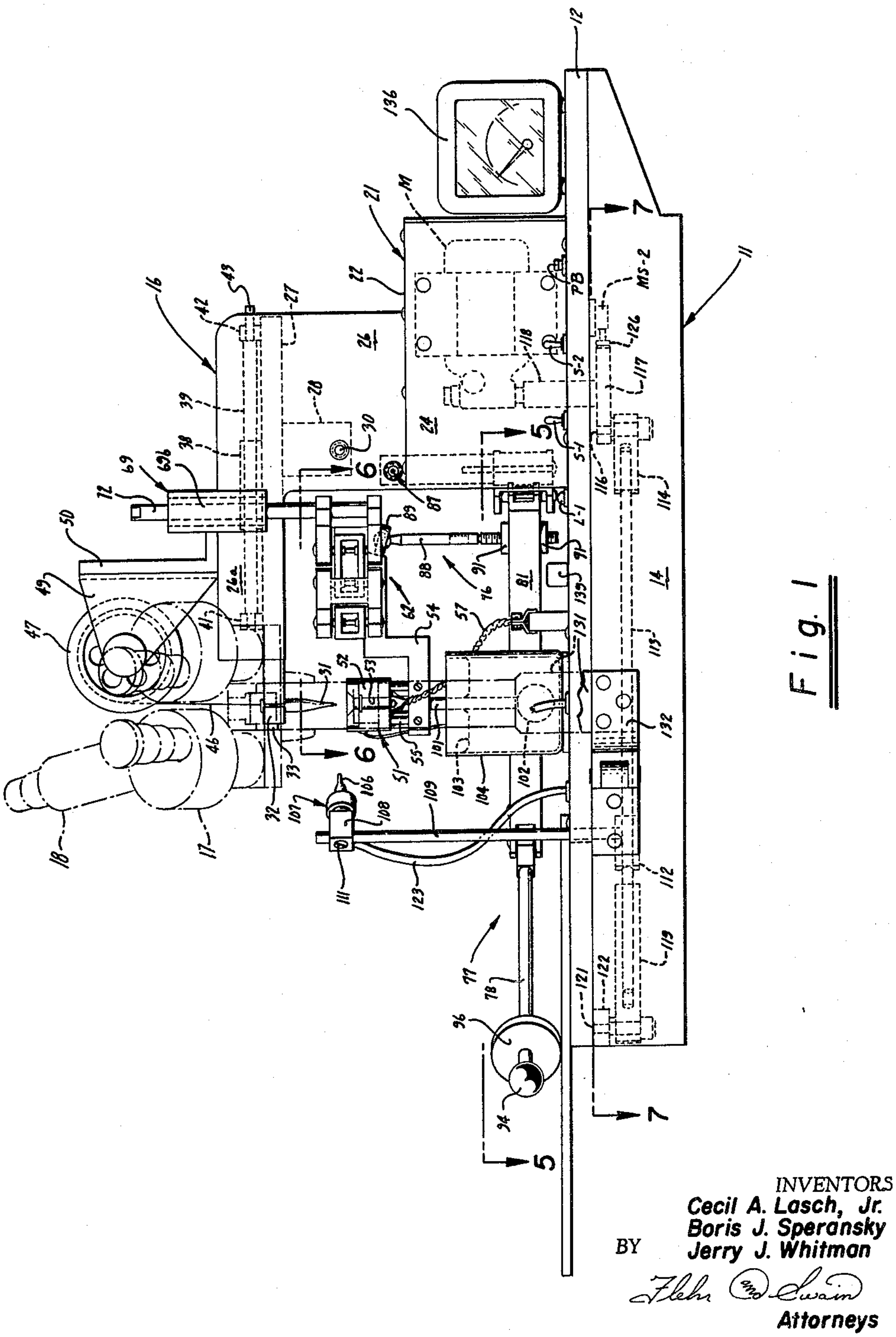
FIGURE 1 is a side elevational view of a multiple point bonding apparatus incorporating our invention.

In general, our bonding apparatus is used for bonding leads to an element and consists of an element holder for carrying the element. It also consists of a bonding tool and bonding tool support means. Means is provided for causing relative movement between the bonding tool and the element to move the bonding tool and the lead into engagement with each other and to move the lead and the element in the element holder into engagement with each other. This means for causing relative movement includes a particularly novel pantograph-like mechanism which has a manually operable single control lever to cause relative movement along X, Y and Z axes.

As shown in the drawings, our bonding apparatus is comprised of a main rectangular base structure 11 which consists of a top base plate 12 and depending side walls 13 and 14 which are secured thereto. If desired, the entire base structure 11 can be recessed in a work table or bench. The base structure 11 carries a lead bonding machine 16, and a microscope 17 with a lamp 18. The microscope and lamp are of a conventional construction, and for that reason have been shown in phantom lines to make it possible to more clearly illustrate the lead bonding machine.

Figure 2:
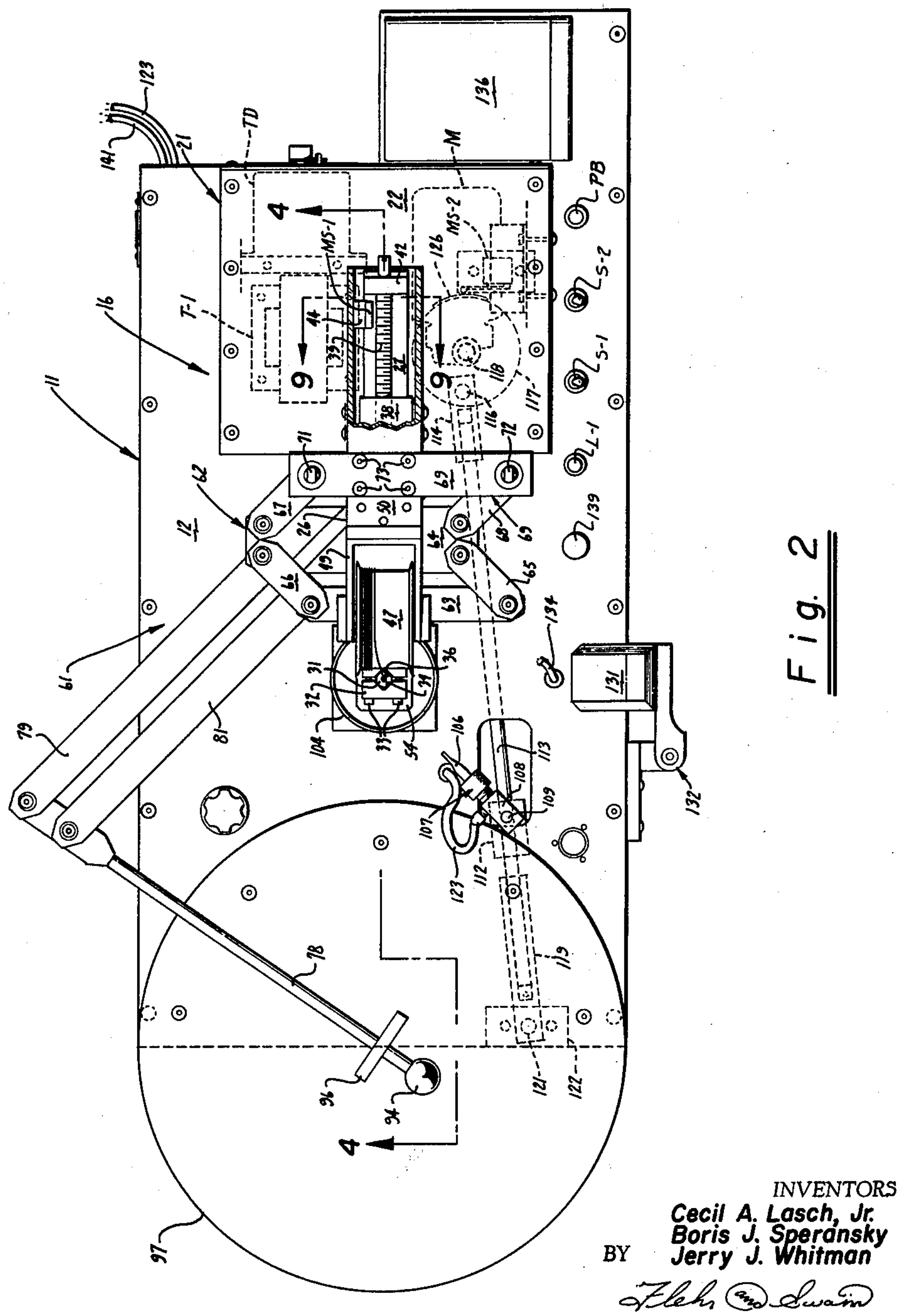
FIGURE 2 is a top plan view of the bonding apparatus shown in FIGURE 1.
Figure 3:
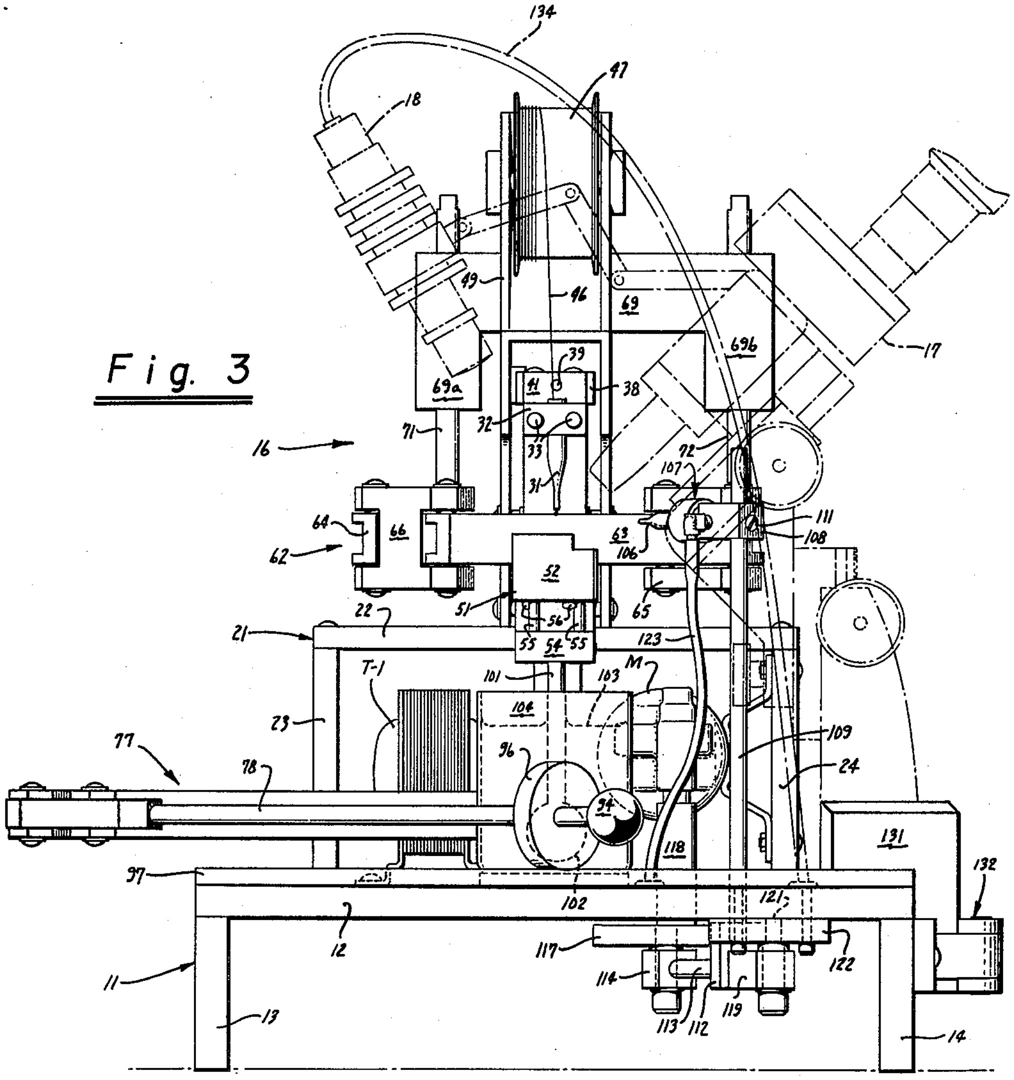
FIGURE 3 is a front elevational view of the bonding apparatus shown in FIGURES 1 and 2.

The lead bonding machine 16 is mounted upon a secondary base structure 21 which is fixed on one end of the main or primary base structure 11. The base structure 21 consists of a top base plate 22 and side walls 23 and 24 which are secured thereto. As shown particularly in FIGURES 1, 2 and 3, the base structure 21 serves as an enclosure for a gear motor M, a transformer T1 and a time delay device TD which are used for purposes hereinafter described.

A bonding tool support arm housing 26 is mounted upon the secondary base structure 21. As shown, this housing 26 is substantially L-shaped and is provided with one leg portion 26a which extends over the primary base 11 in front of the secondary base structure 21 as shown particularly in FIGURE 1. A bonding tool support arm 27 is pivotally mounted within the housing. It is provided with a mounting block 28 which is affixed to the arm 27 intermediate the ends of the same by screws 29. The block 28 is pivotally mounted on a pin 30 extending through the side walls of the housing 26.

A bonding tool 31 of a suitable type such as a glass capillary tube is mounted in the forward end of the support arm. As is well known to those skilled in the art, this type of bonding tool has a capillary passage extending through a cylindrical glass rod which has been drawn to a very fine point. The capillary passage at its lower end will just accommodate the size of lead wire which is to be utilized with the apparatus. Clamping means is provided on the end of the support arm 27 for carrying the bonding tool 31 which serves to center and vertically align the bonding tool or the capillary. This clamping means consists of a bar 32 which is secured to the end of the support arm 27 by suitable means such as screws 33. As can be seen particularly from FIGURE 2, the bar 32 and the end of the support arm 27 have been provided with V-shaped cut-outs 34 and 36 which face each other and form a substantially square hole in which a line passing through two of the corners of the square hole extend in a direction which is parallel to the longitudinal axis of the support arm. In mounting a bonding tool 31 on the support arm, the screws 33 are loosened and the bonding tool is inserted into the V-shaped cut-outs 34 and 36. Thereafter, the screws are tightened to engage the circumference of the bonding tool to center the same with respect to the support arm 27 and also to vertically align the same with respect to the support arm. For reasons hereinafter pointed out, the bonding tool is positioned so that its lower extremity normally lies in substantially the same horizontal plane in which the pin 30 for pivotally supporting the arm lies.

Means is provided on the support arm 27 for predetermining the pressure which will be utilized during the bonding operation and consists of a weight in the form of a block 38 which is mounted on top of the support arm and which is to be adapted to be shifted longitudinally of the support arm by a lead screw 39. The lead screw has one end rotatably mounted in a block 41 affixed to the forward end of the support arm 27 and the other end rotatably mounted on a block 42 affixed to the rear end of the support arm 27. As shown particularly in FIGURE 1, the lead screw 39 is provided with a tool receiving groove 43 which is accessible from the rear of the machine so that the weight 38 readily can be shifted longitudinally of the support arm to a desired direction by rotation of the lead screw 39.

Figure 9:
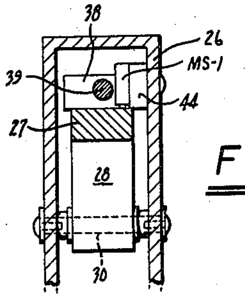
FIGURE 9 is a cross-sectional view taken along the line 9—9 of FIGURE 2.

A microswitch MS–1 is provided within the arm support housing 26 and is carried by a block 44 which is secured to the side wall of the support arm housing 26. As shown particularly in FIGURE 9, the block 44 is dimensioned so that it serves as an upper limit for upward travel of the rear end of the support arm 27. In this uppermost position as shown in FIGURE 9, the microswitch MS–1 is operated for a purpose hereinafter described.

Means is provided for storing a quantity of lead wire 46 on the bonding machine and consists of a reel 47 of a type described in copending application Serial No. 112,-644, filed May 25, 1961, now Patent No. 3,134,559. As described in that application, the reel is provided with annular grooves in the interior of the same which carry a plurality of balls 48 (at least two) and which, as described in the above identified application, serve to tension the lead wire as it is unreeled from the reel and which, after the lead wire has been cut, serve to retract the lead wire so that the ball formed on the end of the lead wire is moved into engagement with the lower end of the bonding tool. Suitable means is provided for supporting the reel 47 on the machine and consists of a U-shaped bracket 49 which is affixed to an L-shaped bracket 50 secured to the top of the support arm housing 26. The spool 47 is mounted for rotation on the bracket 49.

The lead wire 46 is adapted to be bonded to an element which normally would be some type of microcircuitry or some semiconductor device such as a transistor or a diode. This microcircuit device or element would be carried by a header (also not shown). This element is supported within a holder 51 which can be of any suitable type. The holder shown in the drawing consists of a heater block 52 which is provided with a U-shaped recess 53 for receiving the header which normally carries the element, device or microcircuit upon it. This heater block is supported by four legs 55 which are mounted in holes (not shown) in a heater or holder support arm 54. The heater block is provided with a plurality of heater elements 56 which are connected to circuitry hereinafter described by a cord 57.

Means is provided for causing relative movement between the element in the holder 51 and the bonding tool 31 and consists of a pantograph-like mechanism 61 which is connected to the element holder support arm 54. This pantograph-like mechanism includes a seven bar double parallelogram assembly 62 which consists of arms 63 and 64, links 65, 66, 67 and 68, a yoke 69, and guide rods 71 and 72. The element holder support arm 54 is secured directly to the arm 63, as shown particularly in FIGURE 6. The ends of the arm 63 are pivotally connected to the ends of links 65 and 66. The other ends of the links 65 and 66 are connected to the arm 64 to provide one of the parallelogram assemblies. Links 67 and 68 are also connected to the arm 64 and are affixed to the lower extremities of the guide rods 71 and 72. The vertical guide rods 71 and 72 are rotatably and slidably mounted within depending arm portions 69*a* and 69*b* of the yoke 69. The U-shaped yoke 69 is affixed to the top of the support arm housing 26 by suitable means such as screws 73. From the foregoing description, it can be seen that the arm 64 serves as a common arm for both of the parallelogram assemblies and that the second parallelogram assembly is formed by the arm 64, the links 67 and 68, and that the other arm is formed by the yoke 69 and the interconnecting vertical guide rods 71 and 72. This double or seven bar parallelogram assembly 62 moves (in addition to the assembly's vertical motion) in a generally horizontal plane and gives great versatility in movement of the element holder support arm 54 as hereinafter described.

Figure 4:
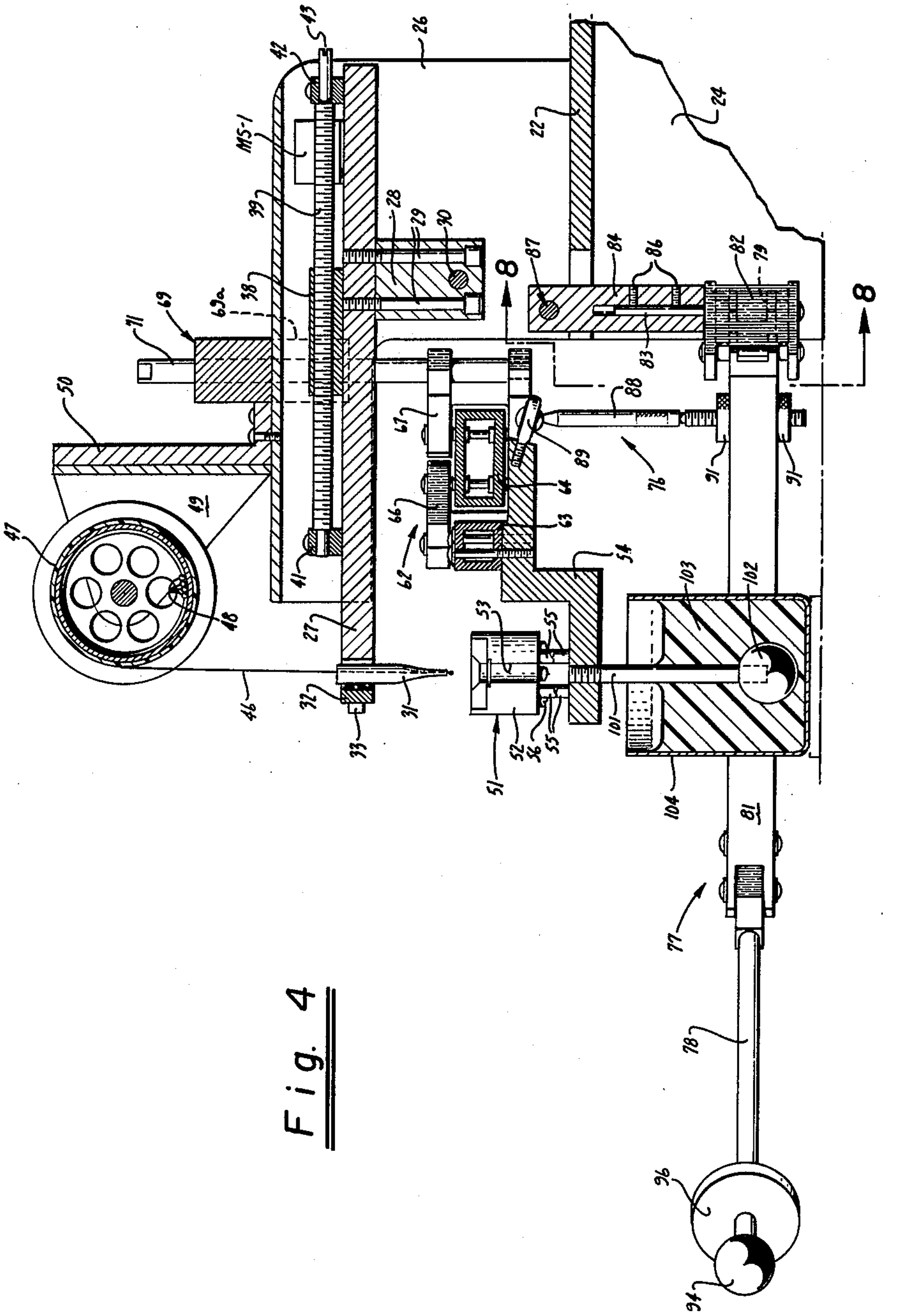
FIGURE 4 is a cross-sectional view taken along the line 4—4 of FIGURE 2.

A pair of additional parallelogram assemblies 76 and 77 are provided as a part of the pantograph-like mechanism 61. The parallelogram assembly 77 is formed by a lever arm 78 which serves as a manual operating arm for the pantograph-like mechanism 61 as hereinafter described. A pair of arms 79 and 81 are pivotally connected to one end of the lever arm 78 as shown particularly in FIGURE 5. The other ends of the arms 79 and 81 are pivotally connected to a link 82. An elongated pin 83 is provided for making the connection between the link 82 and the arm 79 and extends upwardly into an arm 84 and is held therein by set screws 86. The arm 84 is pivotally mounted within the lower extremity of the support arm housing 26 by a pin assembly 87. The arm 84 forms a part of the parallelogram assembly 76. Another part of the parallelogram assembly 76 is formed by a transmission rod 88 which has its upper end connected to a rod end bearing 89. The bearing 89 is affixed to the rear of the element holder support arm 54 as shown particularly in FIGURE 4. The lower extremity of the rod 88 is threaded, as shown, and extends through the arm 81 of the parallelogram assembly 77 and is retained therein by knurled nuts 91 on opposite sides of the arm 81. It can be readily seen that the rod 88 can be vertically positioned relative to the bar 81 merely by shifting of the nuts 91 on the threaded end portion of the same.

From the foregoing description, it can be seen that the movable parallelogram assembly 77 is formed by the lever 78, the arms 79, 81 and the link 82. The fixed parallelogram assembly 76 is formed by the arm 84 and the transmission rod 88, the lower ends of which are interconnected by the link 82 and a portion of the arm 81, and the upper ends of which are pivotally connected through the support arm housing 26, the yoke 69, the guide rods 71 and 72 through the seven bar parallelogram assembly 62 to the element holder support arm 54.

Also, from the foregoing description, it can be seen that the pantograph-like mechanism 61 includes four parallelogram assemblies, the seven bar or double parallelogram assembly 62 and the parallelogram assemblies 76 and 77.

The lever arm 78 is provided with a ball end 94 and a shock absorbing wheel 96 formed of a suitable material such as rubber which is mounted upon the lever arm 78.

When the bonding apparatus is not being used, the lever 78 and the pantograph-like mechanism 61 connected thereto are supported upon a circular table 97 which is mounted on the other end of the base structure 11. This circular plate has a size which will accommodate all of the normal required movement of the pantograph assembly along the X and Y axes and, therefore, serves to support this lever arm in any position in this X–Y area.

As hereinafter described, the pantograph-like mechanism makes it possible to cause relative movement between the bonding tool and the element carried by the element holder along X, Y and Z axes and in the particular embodiment shown in the drawings moves the element relative to a relatively fixed bonding tool along X, Y and Z axes. The X, Y and Z axes are used to indicate a system of rectangular coordinates and movement along the X axis is assumed to be movement from left to right or right to left as viewed in FIGURE 3 (in other words, lateral movement); movement along the Y axis is assumed to be movement from left to right or right to left as viewed in FIGURE 1 (in other words, longitudinal movement); and movement along the Z axis is vertical movement.

Suitable means is provided for damping undesired motion of the element holder support arm 54 and consists of a depending rod 101 which is affixed to the support arm 54 and which is provided with a ball 102 on its lower extremity. The ball 102 is disposed in a suitable viscous substance 103 such as Dow Corning silicone fluid formula 200 which contains dimethylsiloxone and which has a rating of 60,000 centistokes. This viscous substance is contained in a cylindrical container 104 which rests upon the base plate structure 11 immediately below the support arm 54. It can be seen that the ball 102 can travel along X, Y and Z axes within the substance 103 and that the substance 103 will serve as damping means to damp out any undesired sudden movement in the element holder support arm 54.

Figures 5, 6, 7:
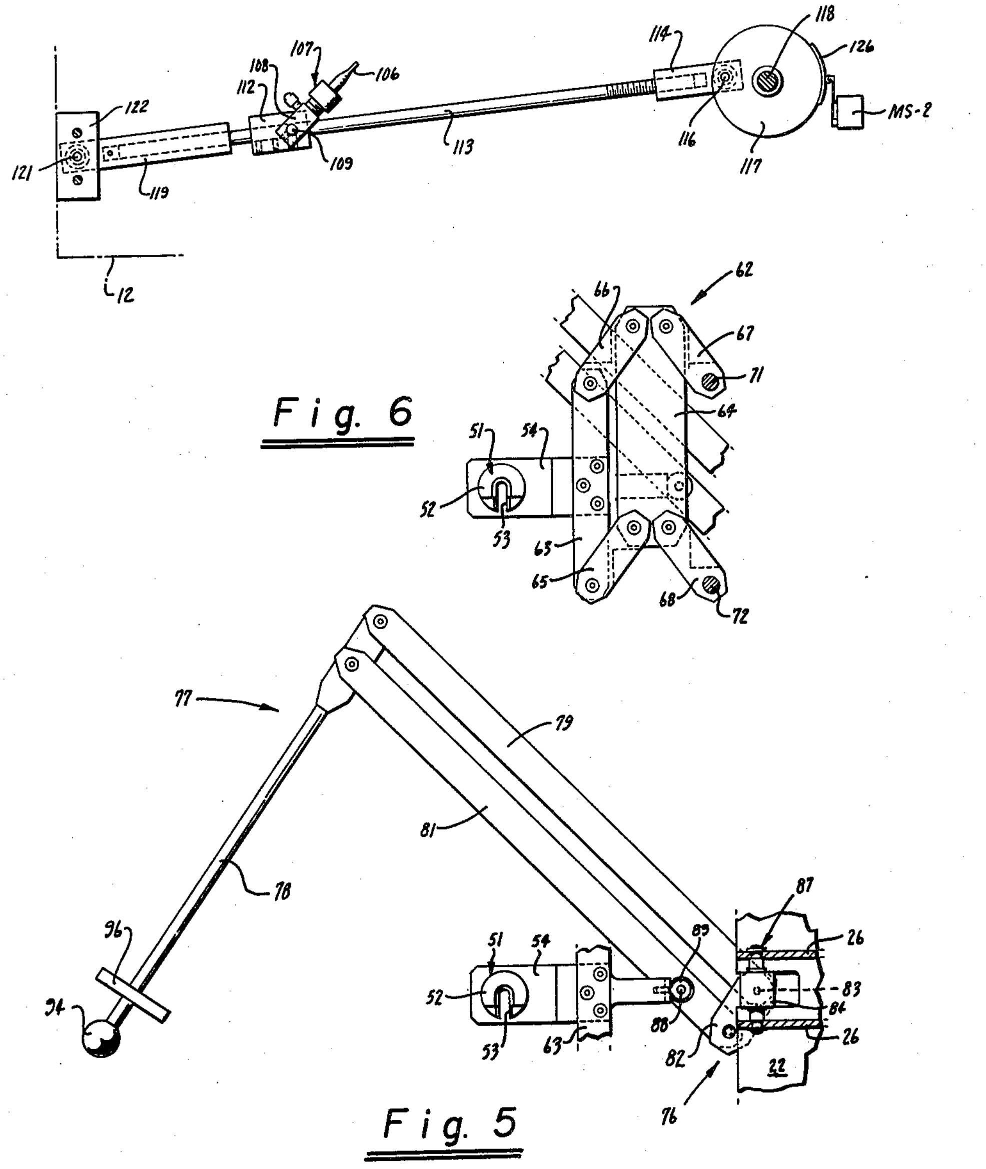
FIGURE 5 is a cross-sectional view taken along the line 5—5 of FIGURE 1 with certain parts omitted.
FIGURE 6 is a cross-sectional view taken along the line 6—6 of FIGURE 1.
FIGURE 7 is a cross-sectional view taken along the line 7—7 of FIGURE 1.
Figure 8:
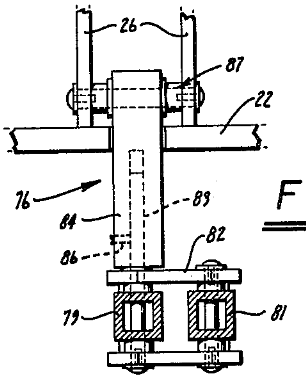
FIGURE 8 is a cross-sectional view taken along the line 8—8 of FIGURE 4.

Means is provided for cutting the lead wire and consists of a torch 106 which is mounted in a ferrule and collet assembly 107 carried by a torch block 108. The torch block 108 is slidably and twistably mounted upon a vertical support rod 109 and, as shown particularly in FIGURE 1, is vertically adjustable on the support rod 109 and is adapted to be retained in a desired vertical position by means of a set screw 111. As shown in FIGURE 1, the torch is positioned so that the flame from the torch will pass only a very slight distance below the bonding tool 31 for a purpose hereinafter described. The support rod 109 is mounted in a block 112 (see FIGURE 7) which is adjustably positioned on a connecting rod 113 by means of set screws 113*a*. The connecting rod 113 is threaded into a bearing block 114 which is eccentrically mounted at 116 on a circular plate 117. The circular plate 117 is affixed to a shaft 118 which extends upwardly through the base plate 12 and is driven by the gear motor M. The other end of the connecting rod is slidably mounted in a pivot bushing 119 which is pivotally connected at 121 to a block 122 affixed to the base plate 12. As shown in FIGURE 7, as the motor M is operated, the torch travels in a substantially oval path to perform a cutting operation. The torch is supplied with a suitable fuel such as hydrogen through a tube 123.

A microswitch MS–2 is secured to the base plate 12 and is adapted to be operated by a cam member 126 provided on the periphery of the drive wheel 117. As can be seen, the cam surface 126 provides a relatively long dwell to accommodate any overrun of the drive motor M.

As pointed out previously, the bonding apparatus can include the microscope 17 and lamp 18. The microscope can be carried by a mounting block 131 which is affixed to a hinge 132 which is secured to the side wall 14 as indicated particularly in FIGURES 2 and 3. This arrangement permits the microscope to be swung out of the way while loading the holder 51. The lamp 18 for use with the microscope 17 is supported by the microscope as shown in the drawings and is provided with power for the lamp through a cord 134.

Figure 10:
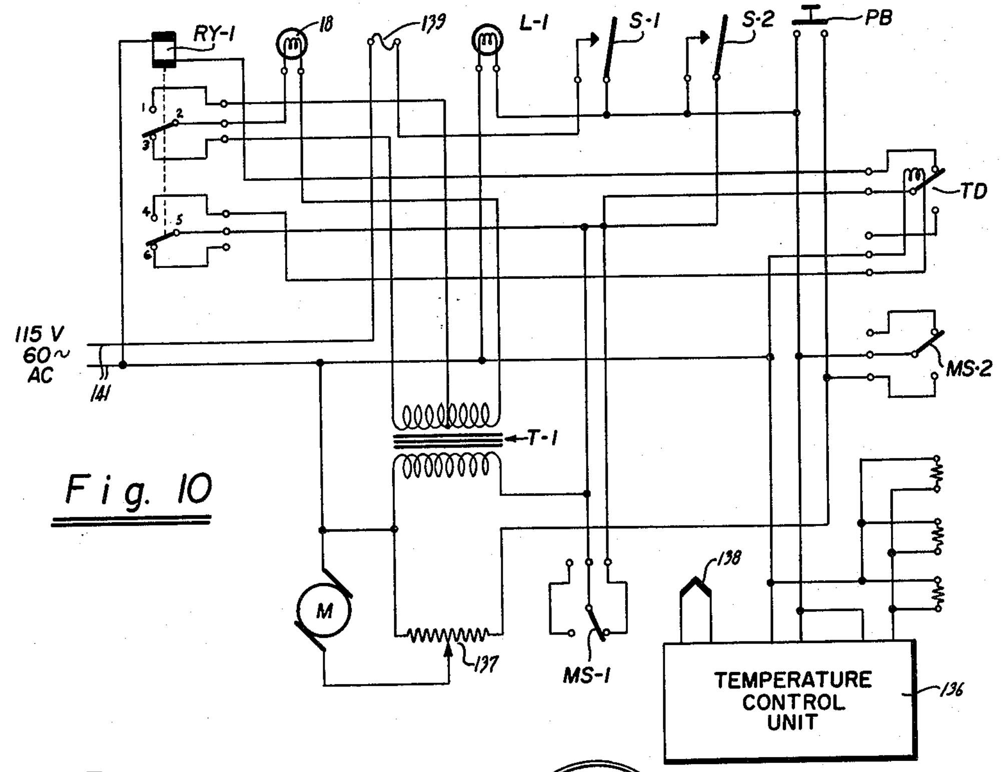
FIGURE 10 is a circuit diagram showing the electrical circuitry utilized in the bonding apparatus.

The electrical circuitry for operating the bonding apparatus is shown in FIGURE 10 and includes a torch pushbutton PB, a power switch S–1 and a power pilot light L–1. The circuitry also includes a suitable temperature control unit 136 such as a "Simplytrol" manufactured by Assembly Products Co., Inc. of Chesterland, Ohio, a potentiometer 137 and a thermocouple 138. The thermocouple 138 is provided in the heater block and is used for sensing the temperature of the heater block. The temperature control unit 136 is utilized for maintaining a constant temperature on the heater block 51 and supplies energy to the heater coils 56 as determined by the thermocouple 138. The entire apparatus is supplied with power from a cord 141 which is connected to a suitable supply such as 115 volts, 60 cycle A.-C.

Operation of our bonding apparatus may now be briefly described as follows. Let it be assumed that it is desired to use gold wire for the lead wire and that it is desired to perform a bonding operation known to those skilled in the art as "thermocompression bonding." In making such a bond, a bonding tool such as a capillary is utilized for pressing a gold bead formed on the end of the gold lead wire against an element of a suitable material such as aluminum. A temperature and pressure are maintained so that a metallurgical bond is established between the gold bead and the element. As is well known to those skilled in the art, this bond is established below the normal eutectic temperature for these metals.

Figure 11:
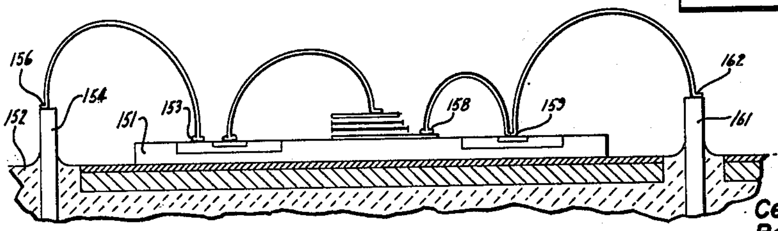
FIGURE 11 is an enlarged view of typical bonding operations completed on a microcircuit.

In utilizing our apparatus to form such a bond, the element 151 (see FIGURE 11) to which the lead wire is to be bonded is supported in the element holder 51 in a suitable manner such as by placing the element on a header 152, a portion of which is shown in FIGURE 11, and then placing the header in the holder 51. Let it be assumed that the apparatus is already operating and that the power switch S–1 has been closed. This will supply power to the pilot light L–1. At the same time that the power switch S–1 is closed, power is supplied to the temperature control unit 136 and to the heater elements 56 as controlled by the temperature control unit 136. The element holder 51 is rapidly heated to the desired temperature when it is inserted in the holder. Now assuming that the lead wire 46 has been threaded through the bonding tool 31 and that a bead has been formed on the lower end of the lead wire, relative movement can be caused to occur between the element carried within holder 51 and the bonding tool by operation of the pantograph-like mechanism 61. In other words, the element carried by the element holder can be moved into engagement with the gold bead exposed at the lower extremity of the bonding tool 31 by grasping the operating lever 78 and then moving it along the X, Y and Z axes as required and as determined by observing the operation under the microscope 17 until the element is properly positioned. The pantograph-like mechanism 61 provided is such that the movement of the element in the element holder exactly follows the path of travel of the ball 94 but on a greatly reduced scale as, for example, 10:1. Thus, for every one inch of movement of the ball 94 along an axis, the element carried by the element holder 51 will be moved approximately .1 of an inch along the same axis. This pantograph-like movement is well known to those skilled in the art, and for that reason will not be described in detail.

When the point at which the bond is to be made to the element is positioned immediately below the bead on the lead 46, the ball 94 is raised by hand along the Z axis or, in other words, upwardly to actually raise the element into engagement with the gold bead to such an extent that the bonding tool support arm 27 is tilted about its pivot 30 and to move the rear end of the support arm 27 away from the block 44 and to thus operate the microswitch MS–1. As hereinbefore explained, the support arm is weighted by the weight 38 so that a predetermined pressure is obtained before the arm 27 will raise to operate microswitch MS–1. This force is applied to the bead carried at the end of the bonding tool so that the required conditions for establishing a satisfactory bond, e.g., the proper temperature and pressure, are met.

As soon as the microswitch MS-1 is operated by raising of the arm 27, it moves from an open position to its normally closed position. As soon as the microswitch MS-1 is closed, it energizes the winding for the relay RY-1 from one side of the power line 141 through the fuse 139, through the power switch S-1, through the microscope switch S-2, through the microswitch MS-1, through the normally closed contacts of the time delay device TD, through the winding for the relay RY-1 to the other side of the power supply. Operation of the relay RY-1 causes dimming of the microscope light 18 to give a visual indication that the bonding cycle has commenced. Before operation of the relay, power is supplied to the lamp 18 through the normally closed contacts 2 and 3 of relay RY-1 from the transformer T-1. When the contacts 2 and 3 are open, and 1 and 2 are closed, power is supplied at a reduced voltage from the center tap of the transformer T-1 to the lamp 18 to give the visual indication hereinbefore described. Closing of contacts 4 and 5 of relay RY-1 energizes the timer motor by supplying power through the fuse 139, the power switch S-1, the microscope switch S-2, contacts 4 and 5 of relay RY-1, through the winding of the timer motor to the other side of the power supply 141. This starts operation of the timer motor which has previously been set for a predetermined time required to form a satisfactory bond. During the time that the timer motor is operating, the element is held in engagement with the bead carried at the end of the bonding tool. It has been found that this can be readily accomplished by holding the lever 78 by hand during the bonding operation. The damping means provided on the support arm serves to damp out any undesired rapid motions.

It has been found that slight motion of the lever arm 78 can be accommodated without affecting the proper formation of the bond. This is possible because of the weighting of the support arm 27 which causes it to follow the element controlled by the lever arm 78.

As soon as the timer TD has completed its cycle, its normally closed contacts will open to deenergize the relay RY-1 which, in turn, will open its contacts 4 and 5 to deenergize the timer motor and open its contacts 1 and 2 and close contacts 2 and 3 to intensify the microscope lamp 18. This signals that the bond has been completed and that the operator can lower the lever arm 78 to lower the element from the bonding tool. As the element is lowered, it will draw the lead wire through the bonding tool off of the reel 47.

If for some reason the operator should not immediately lower the element holder, the microscope light will flash on and off as the contacts of the timer open and close. As soon as the support arm 27 is lowered and the rear end is permitted to operate the microswitch MS-1, the microswitch MS-1 will be opened to prevent energization of the timing device TD. The timer TD recycles automatically and returns to the zero position so that upon the next operation of the relay RY-1, the timer will again start on its predetermined cycle.

Now let it be assumed that the bond 153 has been formed in FIGURE 11 and that it is now desired to bond the lead wire to the post 154. The lever arm 78 is shifted until the post 154 underlies the bonding tool. The header is then raised until the arm 27 is again raised to operate switch MS-2 to initiate the same sequence as hereinbefore described. A knife-edge bond is formed in this case as hereinafter described. After the bond 156 has been completed, the lever 78 can be lowered and the lead wire can be cut at the bond 156 by a pair of nippers or pulled off. If it is desired to only attach one end of a lead wire, the bond is formed as hereinbefore described. After the lever arm 78 has been lowered into engagement with the circular table 97, the torch switch S-1 is operated to energize the torch motor M through the potentiometer 137. The potentiometer 137 is provided to control the speed of rotation of the motor and thereby the speed of movement of the torch. The torch will move in a substantially elliptical path as shown in FIGURE 7, and the flame from the torch will pass over the lead wire to melt the lead wire. During this melting operation, beads or balls will be formed on the upper and lower extremities of the lead wire in a manner well known to those skilled in the art.

The circuitry for energizing the motor M is completed through the normally closed switch MS-2. Operation of the torch switch S-1 serves to override the microswitch MS-2 to permit energization of the motor. The motor will quickly rotate so that the cam surface 26 will move out from under the microswitch to permit the microswitch MS-2 to move to its normally closed position. Operation of the motor continues by the circuit established through the microswitch MS-2 even though the switch S-1 is released and rotation continues until the microswitch MS-2 is again engaged by the cam surface 126 which opens the circuit to the motor M to stop the motor.

As pointed out previously, the torch is positioned so that the lead wire is cut a slight distance below the lower extremity of the bonding tool as, for example, .050 of an inch. As soon as the lead wire has been cut, the reel will rotate because of the action of the balls 48 carried within the reel as hereinbefore described to retract the lead wire until the ball at the end thereof engages the lower extremity of the bonding tool.

When it is desired to form multiple bonds without cutting the lead wire, the initial bond 158 can be formed in a manner hereinbefore described. However, in such a case, the lead wire would not be cut with the torch. After the first bond has been formed, the element holder is lowered slightly and then positioned under the bonding tool so that the bonding tool will urge the lead wire into engagement with the next point of the microcircuitry which again raises the support arm 27 and starts the bonding cycle hereinbefore described. However, in this case, a bead is not formed on the end of the wire but the bonding tool actually engages the wire. In such a bond, only a portion of the bonding tool engages the wire because the wire only extends from one side of the bonding tool. Thus, in effect, the bonding tool provides an arcuate knife-edge or bonding chisel which forms the bond. It has been found that it is much easier to achieve high pressures when utilizing only a portion of the lower extremity of the bonding tool because the total weight is distributed over a much smaller surface area. In other words, the bond 158 is established with the entire circular surface of the bonding tool engaging the gold bead, whereas in the bond 159, only a portion of the circle is utilized in forming the bond.

After the bond 159 is completed, the lever 78 is lowered and shifted so that the post 161 underlies the bonding tool. The bond 162 is completed and the wire is then cut off with a pair of nippers.

It can be seen that this type of bonding can be called a stitch type of bonding because multiple bonds can be made without cutting the lead wire. After the bonding has been completed, the lead wire can be cut by operating the torch switch S-1 if a long lead is required. If the lead wire is not required, it can be broken off or cut off at the weld. As can be seen from FIGURE 11, bonds can also be made to other components such as to inductors and capacitors.

One of the primary advantages of the pantograph-like mechanism 61 which is utilized for causing relative movement between the element in the element holder and the bonding tool is that after a bond operation has been started, slight movement of the operating lever 78 will not affect the bond. This is because there is very little, if any, relative motion between the element holder and the bonding tool upon movement of the element holder and the bonding tool in a vertical direction within a relatively wide range as, for example, one-half inch of movement of the bonding tool which would require over five inches of movement of the lever 78. In other words, as the bonding tool 31 is raised by upward movement of the element holder caused by upward movement of the support lever 78, the horizontal excursion of the bonding tool is minimal because the element holder and the bonding tool follow each other rather closely.

It is apparent from the foregoing that we have provided a new and improved bonding apparatus which is particularly adapted for multiple point bonding and which is also particularly adapted for motions along X, Y and Z axes to give great versatility and to permit the apparatus to be utilized in a great number of different types of bonding operations. The apparatus is constructed in such a manner that it can be operated by relatively unskilled personnel, while at the same time making it possible to obtain bonds of high and uniform quality.

We claim:

1. In a bonding apparatus for bonding leads to an element, an element holder, a bonding tool, bonding tool support means, means for causing relative movement between the bonding tool and the element to move the bonding tool and the lead into engagement with each other and the lead and the element into engagement with each other, said means for causing relative movement including a pantograph-like mechanism said pantograph-like mechanism including first and second parallelogram assemblies lying in substantially parallel planes and a third parallelogram assembly having a fixed arm and interconnecting said first and second parallelogram assemblies and lying in a plane perpendicular to the planes of the first and second parallelogram assemblies.

2. A bonding apparatus as in claim 1 wherein said pantograph-like mechanism includes a control lever connected to said second parallelogram assembly which can be manually positioned.

3. A bonding apparatus as in claim 1 wherein the parallelogram assemblies are arranged so that relative movement can be accomplished along X, Y and Z axes.

4. In a bonding apparatus for bonding leads to an element, a base plate, a support arm housing mounted on the base plate, a support arm pivotally mounted in the housing, a bonding tool mounted on one end of the support arm, an adjustable weight carried by the support arm, an element holder, a support arm carrying said element holder, a yoke mounted on said support arm housing, a pair of vertical guide rods slidably and rotatably mounted in said yoke, a parallelogram assembly connecting said guide rods to said support arm, a manually controlled operating lever, a parallelogram assembly connected to the operating lever, an arm pivotally connected in the support arm housing and connected to said second named parallelogram assembly, and a motion transmission member connecting the element support arm to said second named parallelogram assembly.

5. A bonding apparatus as in claim 4 together with a reel rotatably mounted upon the support housing, a length of lead wire on the reel, the lead wire from the reel extending downwardly through the bonding tool.

6. A bonding apparatus as in claim 4 together with torch means mounted on the base for cutting the lead wire at a point immediately below the tip of the bonding tool.

7. A bonding apparatus as in claim 4 together with switch means controlled by the support arm for the bonding tool for indicating when the element in the bonding tool holder has been moved into engagement with the lead wire carried by the bonding tool.

8. A bonding apparatus as in claim 4 together with a torch for cutting the lead wire, and means for moving the torch in a substantially oval path.

9. In apparatus of the character described, a pair of elements and pantograph-like means for moving the pair of elements relative to each other, said pantograph-like means including a first parallelogram assembly connected to one of the elements, means mounting said first parallelogram assembly for movement in a direction at right angles to the plane of movement of the first parallelogram assembly, a second parallelogram assembly movable in a plane having an operating lever for controlling the same and having a plane of movement substantially parallel to the plane of movement of the first parallelogram, and a third parallelogram assembly connecting the first and second parallelogram assemblies having a fixed arm and having a plane of movement substantially perpendicular to the plane of movement of the first and second parallelogram assemblies.

10. Apparatus as in claim 9 wherein the first parallelogram assembly is a double parallelogram assembly having a common arm.

11. Apparatus as in claim 9 wherein the first and second parallelogram assemblies lie in a substantially horizontal plane and said third parallelogram assembly lies in a substantially vertical plane.

12. A bonding apparatus for bonding leads to an element, a bonding tool, a support arm carrying the bonding tool, means for supporting the bonding arm, means for applying a predetermined weight to the support arm, an element holder adapted to carry an element and means for causing relative movement between the bonding tool and the element carried by the element holder to move the bonding tool and the lead into engagement with each other and the lead and the element into engagement with each other, said means for causing relative movement between the element and the bonding tool including a pantograph-like arrangement having an operating lever in which the element carried by the element holder follows the motion of the operating lever on a reduced scale.

13. A bonding apparatus as in claim 12 together with means for damping the motion of the element holder.

14. A bonding apparatus as in claim 12 wherein the pantograph-like mechanism includes a first parallelogram assembly connected to the lever arm, a second parallelogram assembly connected to the element holder and a third parallelogram assembly having a fixed arm connecting the first named and second named parallelogram assemblies.

References Cited by the Examiner

UNITED STATES PATENTS

| | | | |
|---|---|---|---|
| 2,433,464 | 12/47 | La Plante | 219—158 |
| 3,050,617 | 8/62 | Lasch et al. | 219—85 |
| 3,083,291 | 3/63 | Soffa et al. | 219—85 |

RICHARD M. WOOD, *Primary Examiner.*